United States Patent [19]

Sharpe

[11] Patent Number: 5,456,499
[45] Date of Patent: Oct. 10, 1995

[54] HULL FITTING

[75] Inventor: Curtis Sharpe, Matthews, N.C.

[73] Assignee: Conbraco Industries, Inc., Matthews, N.C.

[21] Appl. No.: 291,143

[22] Filed: Aug. 16, 1994

[51] Int. Cl.⁶ .................................................. F16L 39/00
[52] U.S. Cl. .............................. 285/39; 285/46; 285/161; 285/175; 285/179; 285/206
[58] Field of Search .................. 285/206, 46, 39, 285/161, 175, 179

[56] References Cited

U.S. PATENT DOCUMENTS

| | | | |
|---|---|---|---|
| 913,265 | 2/1909 | Coppage | 285/206 |
| 1,026,632 | 5/1912 | Mueller | 285/46 |
| 1,537,194 | 5/1925 | Rogers | 285/46 X |
| 1,799,316 | 1/1931 | Mueller | 285/46 X |
| 2,837,134 | 6/1958 | Steer . | |
| 2,874,749 | 2/1959 | Brink . | |
| 3,749,424 | 7/1973 | Greene . | |
| 4,145,075 | 3/1979 | Holzmann . | |
| 4,224,464 | 9/1980 | Bunnell et al. . | |
| 4,234,218 | 11/1980 | Rogers . | |
| 4,825,905 | 5/1989 | Whitley, II . | |
| 4,828,296 | 5/1989 | Medvick . | |
| 4,872,531 | 10/1989 | Meisenburg et al. . | |
| 5,129,684 | 7/1992 | Lawrence et al. . | |
| 5,273,466 | 12/1993 | Thompson . | |

FOREIGN PATENT DOCUMENTS 5033 of 1904 United Kingdom ................... 285/206

*Primary Examiner*—Dave W. Arola
*Attorney, Agent, or Firm*—Shefte, Pinckney & Sawyer

[57] ABSTRACT

A fitting for directing fluid flow through a fluid impervious wall includes an internally threaded conduit portion and an externally threaded retainer portion wherein the retainer portion includes two tab members for acquisition by a retention tool during fabrication and installation and the conduit also includes an input portion substantially similar in diameter to the preformed opening in the fluid impervious wall for maximizing flow rate through the fitting.

14 Claims, 2 Drawing Sheets

HULL FITTING

BACKGROUND OF THE INVENTION

The present invention relates broadly to fittings for directing fluid flow through hulls, bulkheads or other fluid impervious walls and, more particularly, to a two-piece hull fitting having an internally threaded conduit member and an externally threaded corresponding retainer for fitment to a preformed opening in a hull, bulkhead or other fluid impervious wall wherein the volumetric flow rate of any fluid passing therethrough is maximized relative to the size of the preformed opening.

In the past, two-piece hull fittings have typically included a hollow, threaded member having a flange formed at one end thereof for abutment to a hull when the conduit is passed through a preformed opening therein. A threaded nut-like member is attached to the conduit on the other side of the hull and tightened thereagainst, forming a seal on both sides of the hull. Hoses are typically attached to one end or the other to direct fluid flow through the hollow conduit. Typically, the diameter of the passageway formed the hollow conduit is substantially less than the diameter of the preformed opening in the hull. This results in fluid flow at a volumetric flow rate which was less than that which could be achieved through the preformed opening without a fitting.

One example of such a fitting is found in Medvick U.S. Pat. No. 4,828,296. There, a fluid coupling is provided having a substantially constricted flow passageway relative to the required bulkhead opening. Rogers U.S. Pat. 4,234,218 offers another example.

The above patents are indicative of another problem with hull fittings, namely, complicated mounting structures. The Medvick patent discloses a hull fitting using numerous parts. Other complicated hull fittings are illustrated in Lawrence et al U.S. Pat. No. 5,129,684, Bunnell et al U.S. Pat. No. 4,224,464 and a Greene U.S. Pat. No. 3,749,424. All disclose fittings having a multiplicity of constituent parts.

SUMMARY OF THE INVENTION

It is accordingly an object of the present invention to provide a through hull fitting which offers an enhanced flow rate, comparable to the absence of a hull fitting.

It is further an object of the present invention to provide such a hull fitting using a minimum number of constituent parts.

It is another object of the present invention to provide such a hull fitting that may be easily fabricated using simple and inexpensive machining methods.

To that end, a fitting for directing fluid flow through a preformed opening in a fluid impervious wall includes a conduit arrangement for receiving fluid flow having an inlet portion conforming generally in dimension with the preformed opening in a retaining member for engaging and retaining the conduit against the wall in communication with the preformed opening, the retaining member including a fluid passageway formed therethrough for communication with the conduit for directing fluid flow therethrough, the passageway being formed with walls having at least one protrusion formed thereon and projecting a predetermined distance into the passageway for acquisition by a retention tool during fabrication and installation without significantly impeding fluid flow through an operational fitting. It is preferred that the passageway forming walls include two spaced, horizontally opposed protrusions, formed as tabs, projecting into the passageway.

Preferably, the conduit includes threads formed on an interior portion thereof and the retainer includes threads formed on an outer surface thereof with the retainer threads being formed in compatibility with the conduit threads for interlocking therebetween to retain the retainer and the conduit in a mated relationship. Preferably, the conduit also includes a flared entry portion formed internally therein adjacent the threads with the widest portion of the flared portion conforming substantially in dimension with the preformed wall opening.

It is preferred that the conduit include an input end having an annular flange projecting radially outwardly therefrom and the retainer also includes an input end having an annular flange projecting outwardly therefrom. The conduit flange and the retainer flange are for abutment against an inner surface and an outer surface of the fluid impervious wall when the conduit and retainer are engaged for forming a seal around the preformed opening. Preferably the retaining member flange is formed with a concave portion facing the fluid impervious wall for the disposition therein of a sealing compound for enhanced sealing around the preformed opening.

It is preferred that the conduit include a discharge portion having at least one raised surface portion formed thereon for retaining a continuing conduit thereon. Preferably, the conduit includes a smoothly curved portion extending through substantially 90°.

DETAILED DESCRIPTION OF THE PREFERRED EMBODIMENTS

Figure 1:
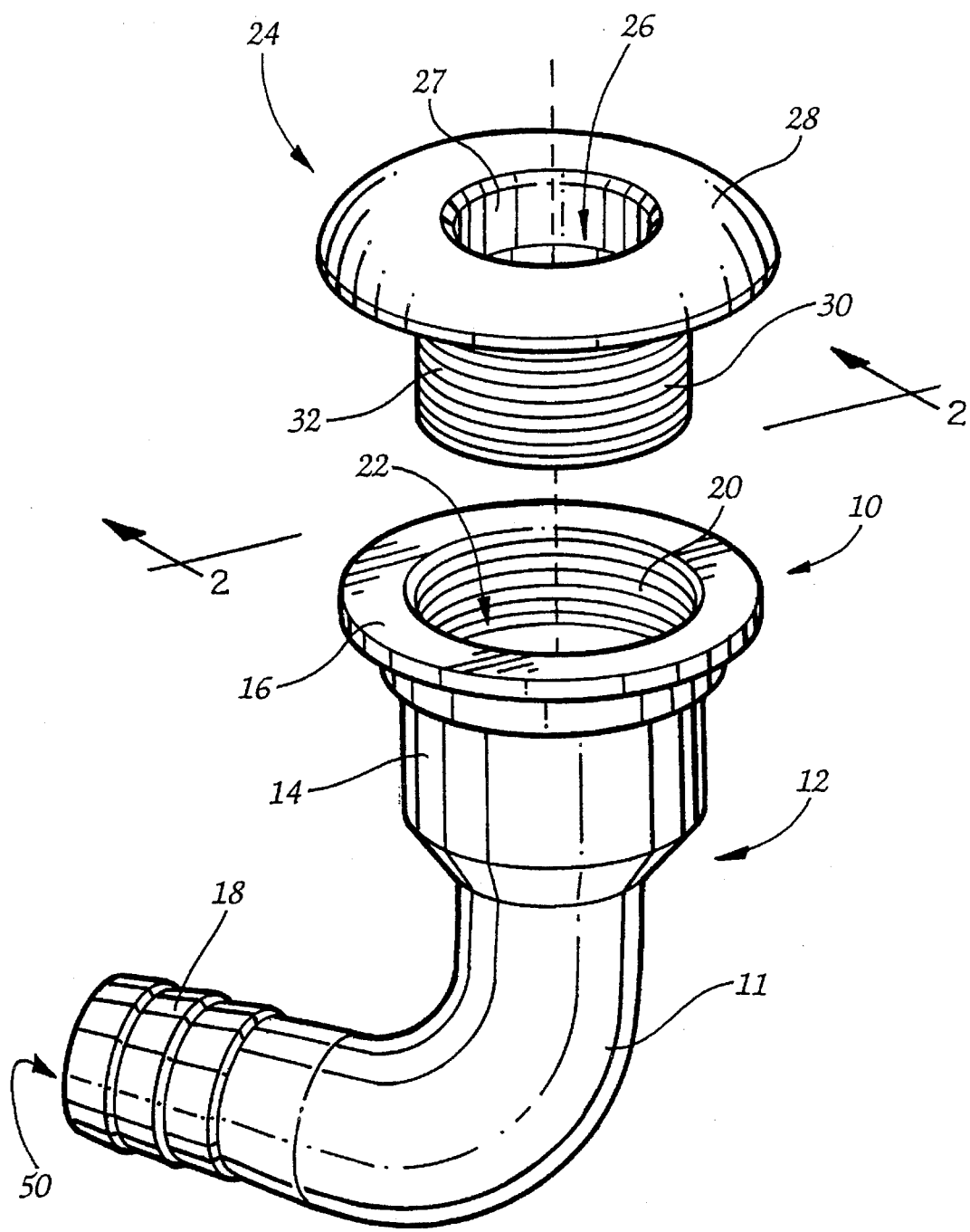
FIG. 1 is a perspective view of a fitting according to the preferred embodiment of the present invention.
Figure 2:
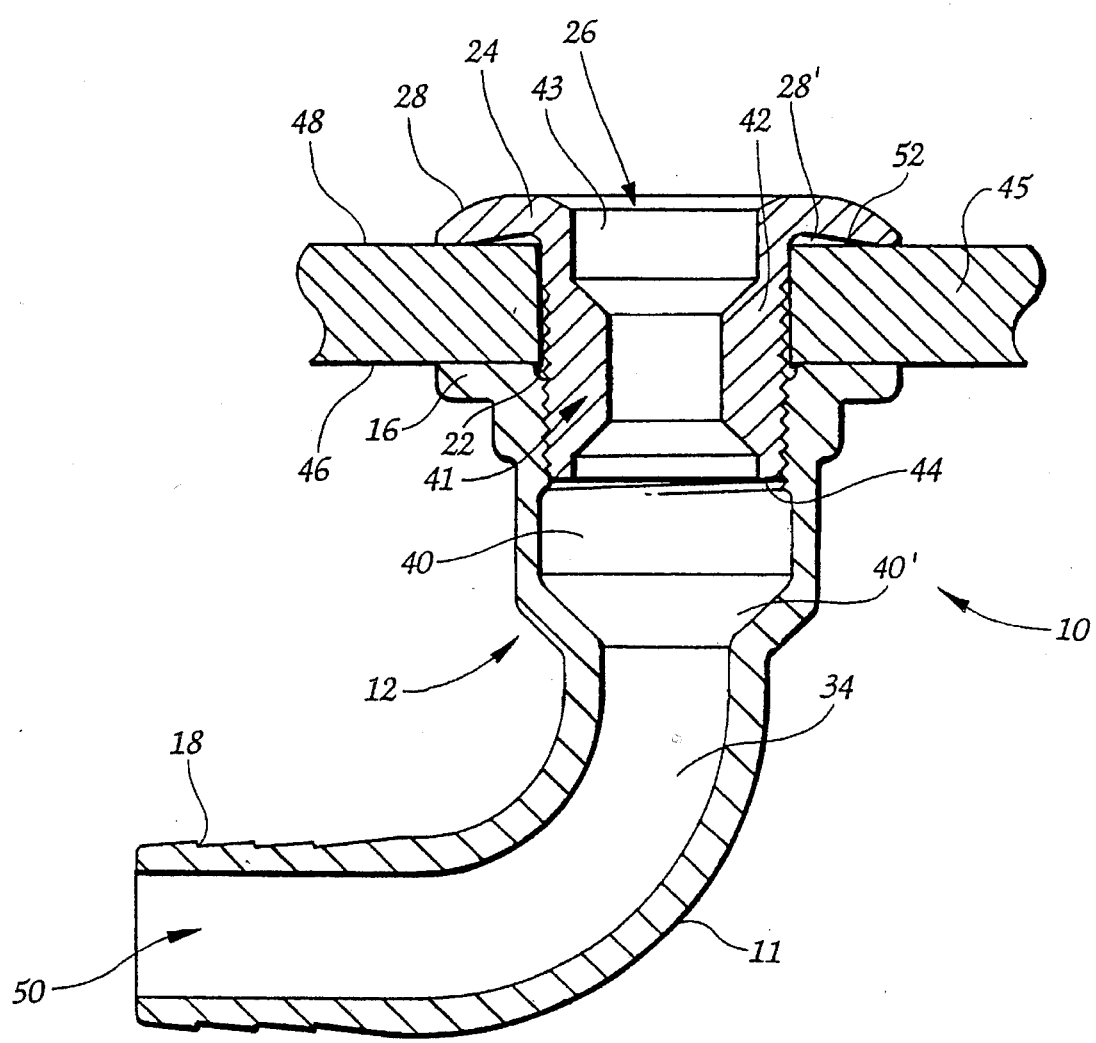
FIG. 2 is a cross-sectional view of the fitting illustrated in FIG. 1 taken along lines 2—2 thereof.

Turning now to the drawings and, more particularly, to FIG. 1, a fitting for directing fluid flow through a preformed opening in a fluid impervious wall is illustrated generally at 10 and includes a conduit member 12 and a retaining member 24. FIG. 1 illustrates the fitting 10 in an exploded view and FIG. 2 illustrates the fitting 10 in a mated relationship to include a fluid impervious wall 45. Regarding FIG. 1, the wall is omitted and the parts are represented in an exploded view for clarity. However, the cross-sectional aspect of FIG. 2 is otherwise represented by lines 2—2 in FIG. 1.

Looking specifically at FIG. 1, the conduit 12 includes a generally cylindrical input portion 14 integrally formed with a curved lower body portion 11 which extends through generally 90° of curvature. While the preferred embodiment of the fitting of the present invention is illustrated as including a curved lower body portion, it is contemplated within the scope of the invention that the conduit could be formed at any angle chosen. The input portion 14 includes an input opening 22 and an annular, washer-like flange 16 projecting radially outwardly therefrom. The outer surface of the flange is flat for abutment against a hull, bulkhead or other wall. An input opening 22 is formed in the center of the flange 16 and is communicated with the input portion 14 and the lower conduit 11. A set of threads 20 is formed internally within the input portion 14 to extend downwardly from the area immediately adjacent the flange 16. As will be seen, the threads are matable with a retainer 24. A plurality of raised cylindrical members 18 are formed adjacent a discharge opening 50 in the lower body portion 11 to retain a flexible tube, hose or other continuing conduit (not shown) for directing fluid flow exiting the fitting 10.

The retainer 24 includes a generally cylindrical body portion 32 having an input opening 26 and a fluid passageway 27 extending therethrough. The outer surface of the body 32 includes threads 30 which are matable with the threads 20 formed in the input portion 14 of the conduit 12. An annular flange 28 is formed integrally with the body portion 32 and extends radially outwardly therefrom. The opening in the flange 28 is concentric with the fluid passageway 27. The lower surface 28' of the flange 28 is slightly concave for partial abutment against the fluid impervious wall while defining an area for application and retention of a sealing compound therein for enhanced sealing at the preformed opening.

The fitting of the present invention is preferably formed of brass, steel or other metal. Due to the externally threaded retainer and the internally threaded conduit, manufacturing ease is greatly enhanced. Further, the retainer member 24 includes two spaced, horizontally opposed tabs 41,42 formed to project a predetermined distance into the fluid passageway 43. The tabs are generally trapezoidal in cross-section, as seen in FIG. 2, and are provided for engagement by a retention tool, such as a clamp or wrench, during fabrication and installation. With this configuration, the machining of the parts is reduced to a simple, cost-effective thread chasing and tapping operation.

Another unique attribute of the present invention is its ability to maximize flow rate for any given size of hull opening. This is best illustrated in FIG. 2 which depicts the present invention in an operational setting affixed to a preformed opening in a hull 45. It can be seen in FIG. 2 that the retainer member 24 is threadedly engaged with the conduit with both flat surfaces of each flange in abutment with inner and outer surfaces 46,48 of the hull 45.

The fluid passageway 27 formed in the retainer member 43 is formed with an internal diameter substantially equal to the internal diameter of the fluid passageway 34 formed in the conduit 12 provides a volumetric flow rate which is maximized for the size of the hull opening 52.

Beyond the junction 44, the conduit 12 includes an input region 40 which is formed with a diameter substantially the same as the preformed opening 52 in the hull 45 and communicates with the remainder of the fluid passageway 34 which is of constant diameter and extends to the discharge opening 50, curving through substantially 90° in the process.

In operation, the conduit 12 is fitted against an inner surface 46 of the hull 45. It should be noted that mating of the fitting 10 to the inner surface 46 and outer surface 48 is herein described in an illustrative manner, and it is not intended to limit the application of the present invention to a situation wherein the conduit portion 12 is on the inside surface 46 of the hull 45 while the retainer 24 is on the outside surface 48 of the hull 45. The present invention is capable of wide applications and it is contemplated that the fitting may be mounted in a reverse manner with the conduit 12 on the outer surface 48 of the hull 45 and the retainer 24 on the inner surface 46 of the hull 45. Additionally, the fluid flow may flow in either direction.

Once the orientation is chosen, the conduit 12 is held in place against the inner surface of the hull 46 with the input opening 22 in registry with the preformed opening 52 in the hull 45. The retainer 24 is then fitted through the opening 52 in the hull 45 from the opposite side with the threads 32 engaged with the threads 20 of the conduit 12, the retainer 24 being firmly held in place by application of a wrench (not shown) to the tabs 41,42. The retainer 24 is then tightened until the inner flange surfaces are in abutment with the hull surfaces in a fluid tight relationship. Optionally, a sealing compound may be applied in the concave region of the inner flange surface 28' for enhanced sealing. A continuing conduit (not shown), such as a flexible hose, can then be fitted to the discharge end 50 of the conduit 12 with the projecting ridges 18 retaining the continuing conduit in place.

Fluid flow is introduced into the input opening 26 to the retainer for continuous flow through the fitting 10. The fluid then exits the retainer 24 and enters the input portion 40 of the conduit 12, and flows into the fluid passageway 34. Since the fluid passageway of the conduit 12 is substantially the same diameter as the retainer fluid passageway 43, the fluid flow is maximized for any size hull opening 52. The fluid continues outwardly through the fluid passageway 34 to the discharge end 50 wherethrough it exits the fitting 10.

By the above, the present invention provides a hull fitting which enhances ease of manufacture by allowing simpler, more inexpensive machining methods to be used, maximizes the cross-sectional flow area for any given hull opening diameter, and incorporates smooth flow directional changes which, in plastic or die-castable parts, are only available at increased cost.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A fitting for directing fluid flow through a preformed opening in a fluid impervious wall, said fitting comprising conduit means for receiving and directing fluid flow, having an inlet portion conforming in dimension with said preformed opening and retainer means for engaging and retaining said conduit means against the wall in communication with said preformed opening, said retainer means having a fluid passageway formed therethrough in communication with said conduit means for directing fluid flow therethrough, said passageway being formed with walls having at least one protrusion formed thereon and projecting a predetermined distance into said passageway for acquisition by a retention tool during fabrication and installation, without significantly impeding fluid flow through said fitting.

2. A fitting according to claim 1 wherein said conduit means includes threads formed on an internal portion thereof and said retainer means includes threads formed on an outer surface thereof, said retainer threads being formed in compatibility with said conduit threads for interlocking therebetween to retain said retainer and said conduit in a mated relationship.

3. A fitting according to claim 2 wherein said conduit means includes a fluid passageway formed internally therein with the widest portion of said fluid passageway conforming substantially in dimension with the widest portion of said retainer means fluid passageway for substantially maximizing flow through said fitting.

4. A fitting according to claim 4 wherein said fluid passageway forming walls include two spaced, horizontally opposed protrusions projecting into said passageway.

5. A fitting according to claim 1 wherein said conduit means includes an input end having an annular flange projecting radially outwardly therefrom and said retaining member includes an input end having an annular flange projecting outwardly therefrom, said conduit means flange and said retaining member flange being for abutment against an inner surface and an outer surface of the fluid impervious wall when said conduit means and said retainer means are engaged for forming a seal around the preformed opening.

6. A fitting according to claim 5 wherein said retaining member flange is formed with a concave portion facing said fluid impervious wall for retention of a sealing compound therein for enhanced sealing around said preformed opening.

7. A fitting according to claim 1 wherein the conduit means includes a discharge portion having at least one raised surface portion formed thereon for retaining a continuing conduit thereon.

8. A fitting according to claim 1 wherein said conduit means includes a smoothly curved portion extending through substantially 90°.

9. A fitting for directing fluid flow through a fluid impervious wall, said fitting being for fitment to a preformed opening in the wall, said fitting comprising:

a conduit member for fluid flow therethrough having an input end and an output end, said input end having an inlet portion conforming in dimension with the preformed opening and an annular flange disposed thereat for abutment against a first wall surface adjacent and in registry with the preformed opening, said input end having threads formed on the inner surface thereof;

a retaining member for holding said conduit in fluid impervious contact with the first wall surface, said retaining member having a body portion with a fluid passageway formed therethrough and an annular flange projecting radially outwardly from one end of said body portion for abutment with a second wall surface adjacent the preformed opening, said body portion having threads formed on the outer surface thereof, said threads being configured to mate with said threads formed on said conduit, said body portion being configured for fitment through the preformed opening with said retaining member threads engaged with said conduit threads and said conduit flange in abutment with the first wall surface and said retaining member flange in abutment with the second wall surface to form a fluid impervious seal at the preformed opening for passage of fluid through said conduit.

10. A fitting according to claim 9 wherein said retaining member fluid passageway is formed by a generally cylindrical wall member having at least one tab member formed thereon and projecting outwardly into said passageway for acquisition by a retention tool during fabrication and installation.

11. A fitting according to claim 10 wherein said passageway wall member includes two spaced horizontally opposed tabs formed thereon.

12. A fitting according to claim 9 wherein said conduit means includes an input portion formed with a diameter corresponding substantially with an internal diameter of said retaining member fluid passageway to provide a volumetric flow rate substantially maximized.

13. A fitting according to claim 9 wherein the conduit means includes a discharge portion having at least one raised surface portion formed thereon for retaining a continuing conduit thereon.

14. A fitting according to claim 9 wherein said conduit means includes a smoothly curved portion extending through substantially 90°.

\* \* \* \* \*

UNITED STATES PATENT AND TRADEMARK OFFICE
CERTIFICATE OF CORRECTION

PATENT NO. : 5,456,499

DATED : October 10, 1995

INVENTOR(S) : Curtis Sharpe

It is certified that error appears in the above-identified patent and that said Letters Patent is hereby corrected as shown below:

Column 1, line 38, after "and" delete "a".

Column 5, line 10, delete "claim 4" and insert therefor -- claim 1 --.

Signed and Sealed this

Eleventh Day of June, 1996

Attest:

BRUCE LEHMAN

Attesting Officer     Commissioner of Patents and Trademarks